June 13, 1944. J. JANDASEK 2,351,516
TURBO TRANSMISSION
Filed May 24, 1940 3 Sheets-Sheet 1
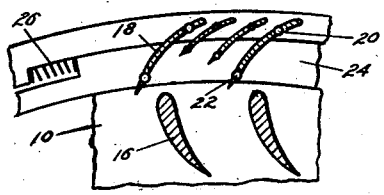
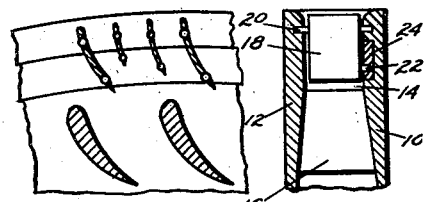
Fig. 1  Fig. 2  Fig. 3
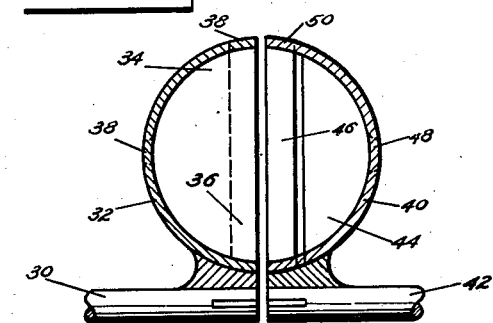
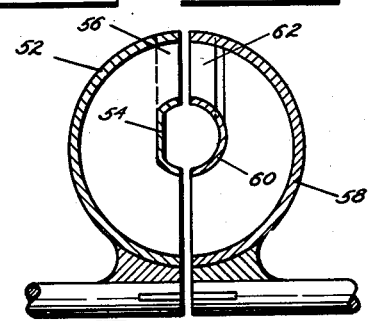
Fig. 4  Fig. 6
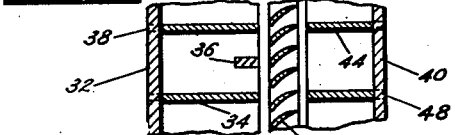
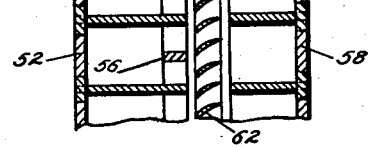
Fig. 5  Fig. 7
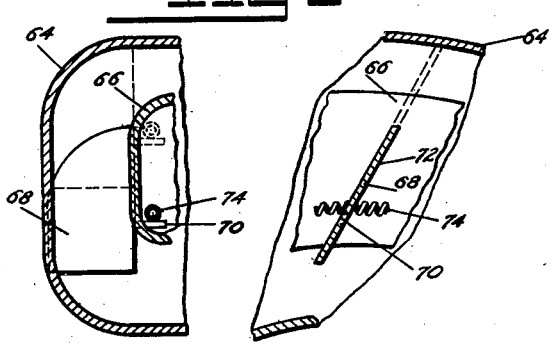
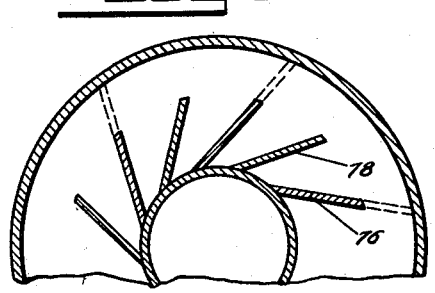
Fig. 8  Fig. 9  Fig. 10
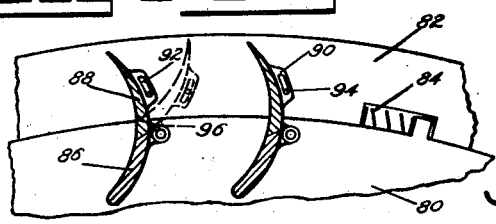
Fig. 11
INVENTOR.
JOSEPH JANDASEK
BY
ATTORNEY

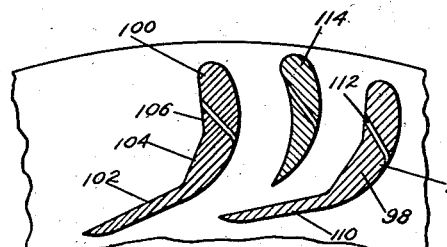
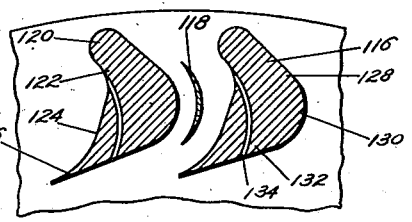
Fig. 12  Fig. 13
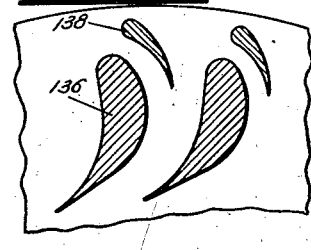
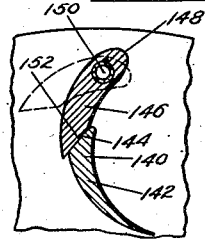
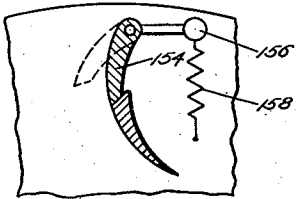
Fig. 14  Fig. 15  Fig. 16
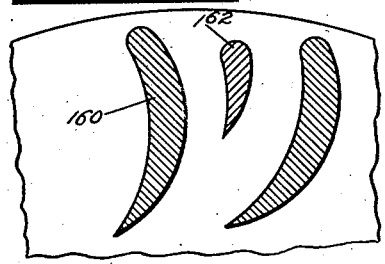
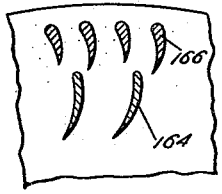
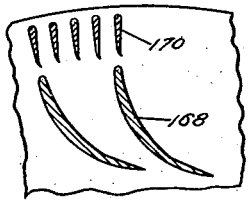
Fig. 17  Fig. 18  Fig. 19
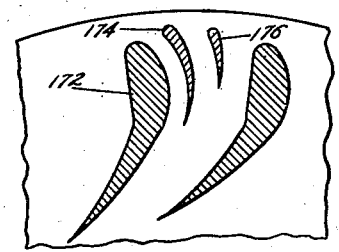
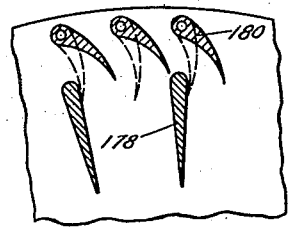
Fig. 20  Fig. 21
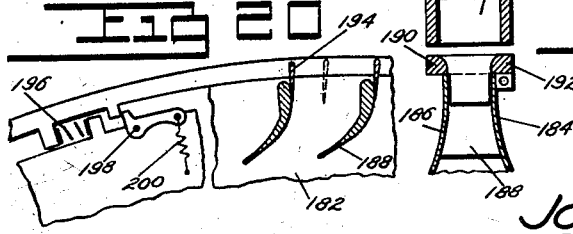
Fig. 22  Fig. 23
INVENTOR.
JOSEPH JANDASEK

INVENTOR.
JOSEPH JANDASEK

Patented June 13, 1944

2,351,516

UNITED STATES PATENT OFFICE 2,351,516

TURBOTRANSMISSION

Joseph Jandasek, Detroit, Mich., assignor to Bendix Aviation Corporation, South Bend, Ind., a corporation of Delaware Application May 24, 1940, Serial No. 337,037

10 Claims. (Cl. 103—115)

This invention relates to turbotransmissions, and more particularly to means for rectifying flow of fluid in a blade wheel so as to maintain an orderly flow.

Broadly the invention comprehends a rotatable wheel having thereon spaced main vanes, and auxiliary vanes cooperating with the main vanes adjustable automatically and continuously under the influence of flow of fluid.

An object of the invention is to provide a rotatable wheel having spaced main vanes, and auxiliary vanes to rectify stream lines for the main vanes so as to obtain orderly flow of fluid between the main vanes, to reduce the number of main vanes, and to reduce the thickness thereof so as to attain increased efficiency.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Figs. 1, 2 and 3 illustrate turbine vanes;

Figs. 4, 5, 6 and 7 illustrate main and rectifying vanes for a turboclutch;

Figs. 8, 9 and 10 illustrate an impeller having sliding vanes;

Fig. 11 illustrates a two-part streamline vane;

Figure 26:
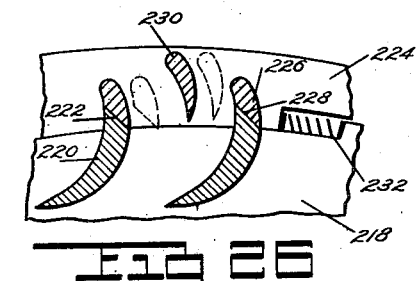
Figure 27:
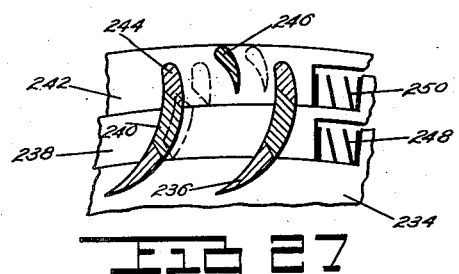
Figure 30:
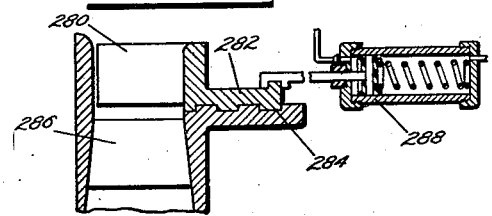
Figure 31:
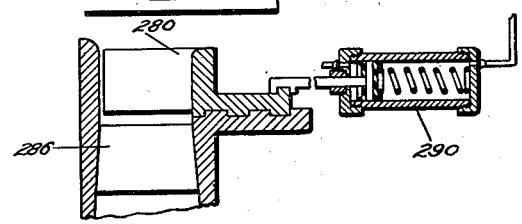
Figure 32:
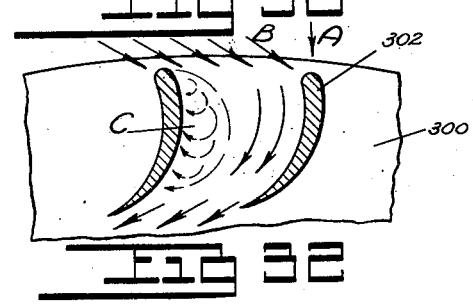

Figs. 12 to 21, both inclusive, illustrate different designs of vanes for prevention of cavitation and eddy currents;

Figs. 22 to 25, both inclusive, illustrate relatively movable main and rectifying vanes;

Figs. 26 and 27 illustrate sectionalized vanes and rectifying vanes relatively movable to the sections;

Figs. 28 to 31, both inclusive, illustrate rectifying vanes shiftable into and out of the fluid circuit; and Fig. 32 illustrates a conventional streamline vane and the resulting cavitation and turbulence.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The greatest difficulty in all turbotransmissions is to attain efficiency due to lack of a definite and constant entrance angle of flow of the fluid. In other words, there is a great variance in the angle of flow of the fluid at the entrance due to variations in speed and load causing fluid impact with the vanes at the wrong angle resulting in eddy currents.

The various vane structures used in these apparatus are illustrated in Figs. 1 to 32. It is of importance that any vanes deviating flow of fluid should have an entrance portion thickened so as to diminish the losses occurring when flow velocity is decreased from circumferential to radial or axial so as to eliminate eddy currents. Similar results may be obtained by gradually diminishing the width of the flow channel at the entrance between the vanes, making the channel narrowest at the entrance as in Figs. 3 and 23 wherein the side walls of the channel take the form of a venturi.

It is also desirable that entrance vanes may be automatically turned in the direction of the flow of the fluid so as to prevent shock losses, as illustrated in Figs. 1, 2, 26, and 27; and, again, it has been found desirable to provide a plurality of short vanes forward of or between the main vanes, as illustrated in Figs. 12, 13, 14, 17, 18, 19, 20, 21, 22, 26 and 27. These vanes serve to rectify the flow of the fluid before the fluid enters between the main vanes so that impact of the fluid against the main vanes will not result in eddy currents. Hereinafter, this type of vane will be referred to as rectifying vanes.

It is, of course, to be understood that the main vanes may be constructed in accordance with the established practice in building water or steam turbines. It is also to be understood that either of these types of rectifying vanes may be employed independently in combination with the main vanes, or any combination of the various types of rectifying vanes may be employed with the main vanes with satisfactory results.

Figs. 1, 2 and 3 represent one specie of structure wherein oppositely disposed sections of turbine walls 10 and 12 are arranged in spaced relation to one another so as to provide a channel 14, preferably in the form of a venturi, and between these walls is a plurality of equi-spaced main vanes 16 of more or less conventional type, preferably having round noses. Arranged at the entrance of the main vanes is a plurality of rectifying vanes 18. As shown, these rectifying vanes are pivoted at 20 to the walls 10 and 12, and each vane is provided with a lateral pin 22 received by a recess in a movable ring 24 mounted for rotatable movement in one of the walls and resisted in movement in one direction only by a resilient member 26.

In the structure shown in Fig. 1, when operating at low speeds and heavy loads, fluid flow is greater; accordingly, the fluid pressure against the rectifying vanes is proportionately greater, and this results in turning the rectifying vanes on their pivots 20 against the resistance to movement of the ring 24 such resistance being presented by the resilient member 26. When operating at high speeds and light loads, the fluid flow is smaller and the pressure against the rectifying vanes is proportionately smaller, resulting in movement of the ring 24 under the influence of the resilient member 26 so that the vanes take the positions as illustrated in Fig. 2, to the end that the vanes may be positioned in the direction of flow to eliminate shock losses. After passing the rectifying vanes, the fluid continues to flow between the main vanes without turbulence.

In Figs. 4 and 5, the structure illustrated is that of a turboclutch wherein rectifying vanes are employed. As shown, a driving shaft 30 carries an impeller shell 32 provided with main blades 34 and auxiliary blades 36. The blades may be secured in the shell as by lugs 38 or other suitable means. Associated with the shell 32 is a turbine shell 40 mounted on a driven shaft 42, and this turbine shell has therein main vanes 44 and rectifying vanes 46, both the main and rectifying vanes being suitably secured to the shell as by lugs 48 and 50, or other suitable means.

Figs. 6 and 7 illustrate a modification of the structure shown in Figs. 4 and 5. In this modification, an impeller shell 52 has a shroud 54 intersecting auxiliary blades 56; and, correspondingly, a turbine shell 58 has a shroud 60 intersecting rectifying vanes 62.

In Figs. 8 and 9, there is illustrated an embodiment of an impeller including a shell 64 having therein a shroud 66, and arranged between the shell and shroud is a plurality of slidable blades 68. As shown, each of the blades has a lug 70 extended through a slot 72 in the shroud, and a garter spring 74 in the shroud embraces the lugs 70 so as to yieldingly retain the blades in positions adjacent the center.

This results in the provision of an impeller of small diameter with blades tipped backwardly from a radial line against the direction of rotation. At certain predetermined high speeds, the inertia of the blades overcomes the tension of the garter spring 74 and the blades slide gradually with increasing speed outwardly in abutting relation to the inner circumference of the shell. This results in an impeller of a greater diameter having an effective discharge in an axial direction. Both of these features, i. e., increase in diameter and change in the discharge angle, increase the efficiency of a turbotransmission at high speeds when operating as a turboclutch.

A modification of the impeller is illustrated in Fig. 10. In this modification slidable blades 76 corresponding to the blades 68 are provided, and arranged in alternating relation to these slidable blades 76 are stationary blades 78.

Another modification of the impeller is illustrated in Fig. 11. In this modification an impeller shell 80 has mounted thereon for slight rotation a ring 82 limited in its movement in one direction as by a resilient member 84. The shell has thereon fixed blades 86, and pivoted to these blades are discharge blades 88 having lugs 90 provided with slots 92 for the reception of pins 94 arranged on the ring 82. At high speeds and light loads, each of the fixed blades 86 and the associated discharge blades 88 function as a continuous blade, and at low speeds and heavy loads the discharge blades are turned on their pivots against resistance to movement of the ring 82 presented by the resilient member 84, so as to take the position indicated in dotted lines. This results in change of the discharge angle and in the provision of a gap 96 between the blades 86 and 88 for the relief of pressure on the face of the blade, resulting in decrease of the impeller torque.

A modification of the main and rectifying vanes and their relation to one another is shown in Fig. 12. In this modification, main vanes 98 arranged in spaced relation to one another each have a rounded entrance edge 100 terminating on one side into a face having flats 102, 104, and 106, the central flat 104 materially increasing the thickness of the blade so as to narrow the fluid channel; and on the other side the entrance edge terminates in a curved portion 108 which in turn terminates in a flat 110, and a duct 112 extended through the blade from the face to the back. Rectifying blades 114 are arranged between the main blades, and these rectifying blades are materially shorter than the main vanes. They have substantially the same profile as the main vanes, and preferably have their entrance edges slightly in advance of the entrance edges of the associated main vanes.

When fluid is flowing through the channel between the main vanes, the flow is rectified by the rectifying vanes 114. However, there is a tendency for the pressure on the face of the vane to be greater than the pressure on the back of the vane, and this is objectionable. To overcome this objection, both the main and rectifying vanes are provided with ducts extended therethrough for relief of excessive pressure on the face of the vanes so as to inhibit backing up of fluid around the entrance edges. The ducts through the vanes are so formed that fluid flowing therethrough may join the flow between the vanes smoothly and prevent separation of the main flow.

Another embodiment of the main and rectifying vanes and their relation to one another is illustrated in Fig. 13. This embodiment of the invention is similar to the structure disclosed in Fig. 12. The principal difference between these two embodiments is to be found in the profile of the main and rectifying vanes. As shown, main vanes 116 are arranged in spaced relation to one another, and a rectifying vane 118 is interposed. Each of the main vanes has a rounded entrance edge 120 at less angle to a line tangential to the turbine than the entrance edges of the main vanes shown in Fig. 12. The face of the vane 116 has a curved surface 122 extended from the entrance edge in an arc terminating in a flat 124, which in turn terminates in an arc 126, and the back of the vane has a flat 128 extended from the entrance edge and terminating in an arc 130 providing substantial thickness or width for the vane, and in turn terminating in a flat 132 converging into the arcuate portion 126 on the face of the vane, and a duct 134 extended therethrough from the face to the back. The rectifying vane 118 in this instance is quite thin in width, and is positioned well into the channel from the entrance thereof, preferably opposite the curved portion 130 on the back of the adjacent main vane so as to avoid turbulence generally due to curvature of the channel. The function of this embodiment of the invention is substantially the same as that of the embodiment illustrated in Fig. 12.

Another embodiment of the invention is illustrated in Fig. 14. In this embodiment spaced main vanes 136 have a profile that may be varied to a greater extent to meet requirements. The main vanes have associated therewith rectifying vanes 138 arranged above the entrance edge and slightly back of the face of the main vane so as to inhibit turbulence immediately back of the entrance edge. These rectifying vanes are comparatively short, and are quite effective to increase fluid guidance.

Another embodiment of the invention is illustrated in Fig. 15. In this embodiment, a vane 140 includes a fixed portion 142 of any suitable profile having a beveled end 144, and another portion 146 having on one end an entrance edge 148 pivoted as at 150 for limited swinging movement and its other end beveled as at 152 for cooperation with the beveled end of the fixed portion. At high speeds and light loads, wherein the fluid pressure is small, the respective portions of the vane cooperate with one another to provide a streamline vane; and at low speeds and heavy loads, wherein the fluid pressure is relatively high, the portion 146 swings on its pivot so as to disengage the beveled ends 144 and 152, and thereby establish a passage between the face and the back of the vane.

A modification of this embodiment is illustrated in Fig. 16, wherein a pivoted portion 154 corresponding to the portion 146 is provided adjacent to its pivoted end with a counter-weight 156 and a spring 158 connecting the weight to a fixed support. The operation is identical to that of the vane illustrated in Fig. 15.

Another embodiment of the invention is illustrated in Fig. 17. In this embodiment of the invention, main vanes 160 of any preferred type are arranged in spaced relation to one another, and rectifying vanes 162 are arranged in alternating relation to the main vanes. The rectifying vanes have a profile including an entrance edge similar to the entrance edge of the main vanes, and this entrance edge is back of the entrance edges of the adjacent main vanes so as to guide the flow of fluid through the channel without turbulence.

Another embodiment of the invention is illustrated in Fig. 18. In this embodiment of the invention main vanes 164 of conventional type are arranged in spaced relation to one another, and rectifying vanes 166 are arranged forward of the main vanes. The rectifying vanes are also arranged in spaced relation to one another and closer to one another than the main vanes, and the rectifying vanes immediately adjacent the backs of the main vanes are somewhat longer than the other rectifying vanes so as to function in a similar manner as the rectifying vanes 138 in Fig. 14.

Another embodiment of the invention is illustrated in Fig. 19. In this embodiment conventional main vanes 168 similar to water or steam turbine vanes are arranged in spaced relation to one another, and rectifying vanes 170 are arranged forward of the main vanes. The rectifying vanes have rounder entrance edges arranged on a circle, and the faces and backs thereof taper toward one another to provide a streamline with a sharp discharge edge. As shown, the rectifying vanes are arranged close to one another so as to direct the flow of fluid to the end that the fluid enters the channel at a proper angle so as to enhance the efficiency of the main vanes.

Another embodiment of the invention is illustrated in Fig. 20. In this embodiment of the invention main vanes 172 of conventional type are arranged in spaced relation to one another, and arranged between each pair of main vanes is a rectifying vane 174 and an auxiliary rectifying vane 176. The rectifying vane 174 is adjacent to the back of one of the main vanes, so as to protect the back against fluid separation, and the auxiliary rectifying vane correspondingly protects the back of the rectifying vane.

Another embodiment of the invention is illustrated in Fig. 21. In this embodiment main vanes 178 of a streamline type are arranged in spaced relation to one another, and rectifying vanes 180 are pivotally supported for cooperation with the main vanes. In high speeds and light loads, the rectifying vanes take the position shown in dotted lines; and in low speeds and heavy loads the rectifying vanes take the position shown in full lines.

Another embodiment of the invention is illustrated in Figs. 22 and 23. In this embodiment of the invention a turbine or guide wheel indicated generally at 182 includes oppositely disposed walls 184 and 186 having therebetween spaced main vanes 188. Supported on the peripheries of the walls 184 and 186 are corresponding rotatable rings 190 and 192 having therebetween rectifying vanes 194 for cooperation with the main vanes. The rectifying vanes 194 are rigidly secured to rings 190 and 192, and the rings are yieldingly held against movement by a resilient member 196, and movement of the rings is also resisted by a weighted lever 198 and a spring 200 opposing movement of the lever due to centrifugal force.

A discharge indicated generally at 202 from any type of blade wheel is arranged opposite the channel between the walls 184 and 186. This discharge has a greater width than the channel, and provides in conjunction with the rings 190 and 192 and the walls 184 and 186 a venturi. Preferably, the width of the discharge is twice that of the narrowest portion of the venturi so as to avoid turbulence and eddy currents.

At low speed and heavy loads, the rectifying vanes 194 take the position indicated in full lines in Fig. 22, and are yieldingly retained in this position by the resilient member 196. As the speed increases, the rings 190 and 192 rotate slightly due to centrifugal force actuating the lever 198 against the resistance of the spring 200 assisted by expansion of the resilient member. This results in gradually shifting the rectifying vanes from the positions shown in full lines to the positions shown in dotted lines, wherein the rectifying vanes are pressed closely against the main vanes, which position they retain during high speed and light loads.

Figure 24:
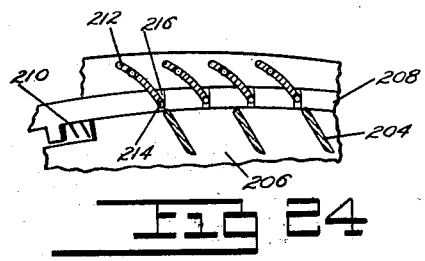
Figure 25:
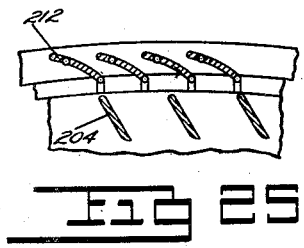

Another embodiment of the invention is illustrated in Figs. 24 and 25. In this embodiment a plurality of main vanes 204 is arranged in spaced relation to one another upon a wheel 206, and a ring 208 is mounted for slight rotation on the wheel adjacent the periphery thereof. This ring is yieldingly retained against rotation in one direction as indicated at 210. Rectifying vanes 212 for cooperation with the main vanes 204 are pivoted on the wheel 206, and are provided with lateral pins 214 received by slots 216 in the ring so that movement of the ring shifts the rectifying vanes. At low speed and heavy loads, the rectifying vanes take the position shown in Fig. 24; and at high speeds and light loads the rectifying vanes take the position shown in Fig. 25.

Another embodiment of the invention is illustrated in Fig. 26. In this embodiment of the invention a wheel 218 has arranged thereon spaced portions 220 of main vanes provided with beveled ends 222. A ring 224 mounted for rotation on the wheel has thereon spaced portions 226 of main vanes provided with beveled ends 228 for cooperation with the beveled ends 222 of the portions 220, and arranged on the ring between the spaced portions 226 are rectifying vanes 230. Rotational movement of the ring 224 is yieldingly resisted by a resilient member 232. The operation of this structure is substantially the same as that of the structure shown in Fig. 22, and need not be reiterated.

Another embodiment of the invention is illustrated in Fig. 27. In this embodiment a wheel 234 has thereon spaced discharge portions 236 of main vanes. A ring 238 rotatable on the wheel has thereon middle portions 240 of the main vanes, and another ring 242 mounted for slight rotation on the ring 238 has thereon entrance portions 244 of main vanes. The portions 236, 240 and 244 are adapted to interlock one another to provide a single stream vane, and positioned on the rotatable ring 242 between the entrance portions 244 are rectifying vanes 246. Rotational movement of the rings 238 and 242 is yieldingly resisted by springs 248 and 250 respectively.

At high speeds and light loads, the vane portions are in engagement with one another to provide a streamline vane as shown in full lines, and as the speed decreases and the load increases, the ring 238 moves slightly against the resistance of the spring 248 carrying with it the entrance portions 244 of the main vane and also the rectifying vane 246, and at still heavier loads the ring 242 rotates slightly against the resistance of the spring 250, resulting in disengagement of the middle portion 240 from the discharge portion 236.

Figure 28:
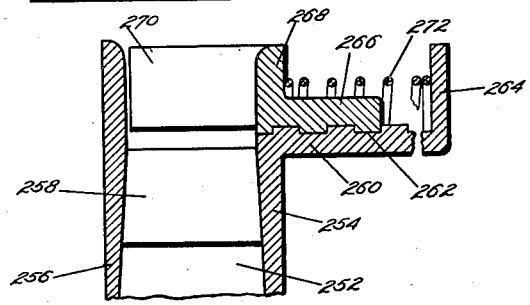

Another embodiment of the invention is illustrated in Fig. 28. In this embodiment of the invention a wheel 252 includes oppositely disposed walls 254 and 256 having therebetween spaced main vanes 258. A flange 260 on one of the side walls has thereon a helix 262 and a marginal flange 264. A sleeve 266 mounted on the helix for travel has a marginal flange 268 supporting a plurality of spaced rectifying vanes 270, and a spring 272 interposed between the flanges 264 and 268 urges the sleeve 266 to rotate on the helix and thereby move the rectifying vanes 270 into the path of the flow of fluid.

At low speeds and heavy loads, fluid entering the wheel impacts on the faces of the rectifying vanes. This results in movement of the sleeve 266 on the helix 262, and the consequent movement of the rectifying vanes 270 into the path of the flow of the fluid, assisted by the spring 272. At high speeds and light loads, fluid impacts on the back of the rectifying vanes, resulting in movement of the sleeve 266 on the helix 262 and the consequent withdrawal of the rectifying vanes from the path of flow of the fluid so that the flow of fluid to the main vanes may be unobstructed.

Figure 29:
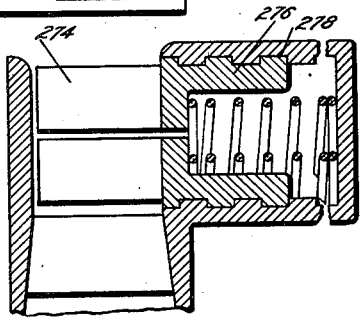

A further development of the embodiment illustrated in Fig. 28 is disclosed in Fig. 29. In this disclosure, the structure is substantially identical to that illustrated in Fig. 28, except insofar as concerns the rectifying vanes. In this development auxiliary rectifying vanes 274 are supported on a sleeve 276 mounted for travel on a helix 278 for cooperation with rectifying vanes similar to the rectifying vanes 270. The operation is substantially the same except that it is believed to produce a more accurate result because of its versatility.

Another embodiment of the invention is illustrated in Fig. 30. In this embodiment of the invention, rectifying vanes 280 supported on a sleeve 282 mounted on a helix 284 for cooperation with the main vanes 286 are moved into and out of the path of fluid flow by impact of the face and back respectively of the rectifying vanes, assisted in one direction of movement by a loaded piston 288 and in the other direction of movement by fluid pressure acting on the piston against the load, the fluid pressure being under control of a suitable governor, not shown, but fully disclosed in my co-pending application filed on even date herewith.

A modification of the embodiment illustrated in Fig. 30 is disclosed in Fig. 31. In this modification, the fluid pressure means for assisting in movement of the rectifying forces is replaced by a vacuum means indicated generally at 290 under control of a governor, also fully disclosed in my co-pending application filed on even date with the instant application.

In Fig. 32, a blade wheel 300 has thereon a plurality of spaced vanes 302 of conventional streamline type. This type of vane is in general use in substantially all water and steam turbines. Vanes of this type have proved satisfactory for such purposes because water or steam enters the wheel at a definite angle, as indicated by arrow A. In turbotransmissions, the entrance angle is variable, and this results in eddy currents substantially as shown by arrow B; also in a separation wherein the fluid leaves the back of the vane, as indicated at C.

The main vanes have usually a ratio H/P between ½ and 3. H=height of the vanes, and P=pitch of the vanes. Such vanes are substantially of the cell-shaped type; i. e., a trajectory drawn at the end of one vane and perpendicular to stream lines intersects the adjacent vane. Regardless of this H/P ratio for main vanes found to be correct and efficient for water and steam turbines, in turbotransmissions eddy currents and turbulences develop between the vanes, and this causes substantial losses because the direction in the flow of entering fluid is very seldom parallel to the entrance portions of the main vanes. The rectifying vanes constituting the basis of the instant application overcome this difficulty.

The rectifying vanes are relatively short in comparison to the main vanes, and are spaced closely together. This results in an orderly flow of fluid between the main vanes substantially the same as when the angle of flow of the fluid is constantly correct. Accordingly, a small number of thin main vanes may be used so as to reduce frictional losses.

An important factor is that the rather short vanes completely rectify all streamlines, and make them parallel to the main vanes. Therefore, the rectifying vanes should be spaced as though they were an independent set of vanes, and, consequently their ratio must also be between ½ and 3; preferably their ratio of H/P should be equal or even greater than the ratio H/P of the main vanes. The invention comprehends the use of two sets of vanes; namely, rectifying vanes associated with main vanes. Each set of these vanes is functioned to perform independently of the other set. It is, of course, apparent that higher ratio H/P should be used when differences in entrance angles of the flow of fluid and the vanes is greater. On the contrary, the smaller ratio H/P can be selected when the difference in entrance angle is less. It is also clear that whenever in any section of the vane curvature increases, the H/P ratio should also be increased in the same proportion. In practice, this may be accomplished by inserting a number of rectifying vanes so that the flow of fluid may be at the correct angle.

The advantage accruing from the present invention of blading, suitable for variable speed transmission, lies in the fact that it can receive fluid from any direction, that it allows of a very small exit angle and a corresponding increase in angular momentum, with reduced wetted areas and frictional losses. With the same circumferential pitch of the new blading, the radial height $h$ may be materially reduced. Furthermore, there may be a reduction in the number of large main vanes, which results in decrease in the manufacturing cost and size of the machine.

While this invention has been described in connection with certain specific embodiments, the principle involved is susceptible of numerous other applications that will readily occur to persons skilled in the art. The invention is, therefore, to be limited only as indicated by the scope of the appended claims.

The instant application is a continuation-in-part of my co-pending applications, Turbine torque converters combined with turbine clutch, filed January 22, 1932, Serial No. 588,163, now Patent No. 2,222,618, issued November 26, 1940, and Turbine torque converters and clutch, filed February 23, 1935, Serial No. 7,896, now Patent No. 2,205,794, issued June 25, 1940.

I claim:

1. A device comprising a rotatable wheel, main vanes having rounded entrance edges arranged in spaced relation to one another on the wheel and providing channels between the vanes for flow of fluid, a plurality of sets of automatically adjustable rectifying vanes of different lengths supported on the wheel and yieldingly urged in one direction for cooperation with the main vanes operative to maintain an optimum entrance angle of flow of fluid through the channels.

2. A device comprising a rotatable wheel, main vanes having enlarged rounded entrance edges arranged on the wheel in spaced relation to one another and providing channels therebetween for flow of fluid, a plurality of rectifying vanes of progressively decreasing length adjacent the entrance edges of the main vanes for deviating the flow of fluid upon variations in speed of and load on the wheel, and yielding means to automatically adjust said rectifying vanes.

3. A fluid transmission comprising a rotatable wheel, streamline main vanes having large rounded entrance edges arranged on the wheel in spaced relation to one another so as to provide channels therebetween, adjustable rectifying vanes supported on the wheel adjacent the entrance edges of the main vanes, there being a plurality of rectifying vanes for each main vane, and yielding means controlling the rectifying vanes whereby said vanes may be automatically actuated by variations in speed and load on the wheel to maintain the entrance angle of the flow of fluid substantially in alignment with the entrance edges of the main vanes.

4. A device comprising a rotatable wheel having oppositely disposed walls providing an axial venturi, streamline vanes having large rounded entrance edges arranged on the wheel between the walls in spaced relation to one another so as to provide channels therebetween, and groups of movable rectifying vanes supported on the wheel adjacent the entrance edges of the main vanes and adapted to be activated by variations in speed and load on the wheel to deviate the flow of the fluid so as to maintain a constant entrance angle of the flow of fluid through the channels.

5. A device comprising a rotatable wheel, a ring mounted for slight rotation on the wheel, means yieldingly resisting movement of the ring in one direction, spaced streamline main vanes on the wheel having rounded entrance edges, and groups of rectifying vanes graduated in lengths pivoted on the wheel and operably connected to the ring and having their discharge ends adjacent the entrance edges of the main vanes.

6. A fluid transmission comprising a rotatable wheel having oppositely disposed walls providing a venturi, spaced streamline main vanes arranged on the wheel between the walls, a ring mounted for slight rotation on the perimeter of one of the walls, and a plurality of rectifying vanes carried by the ring adjacent the entrance to each main vane and movable angularly thereto under the influence of variations in speed of and load on the wheel, there being a plurality of rectifying vanes for each main vane.

7. In a turbotransmission, driving and driven shafts, impeller and turbine elements comprising rotatable toroidal rings fixed to the driving and driven shafts and cooperating to form a power transmitting fluid circuit, main vanes positioned in the turbine ring, a plurality of rectifying vanes positioned in the turbine toroidal ring adjacent the inlet to each of the turbine vanes to rectify the flow of fluid from the impeller to the turbine to produce the optimum angle of fluid flow and minimize fluid turbulence.

8. In a turbotransmission, an energy absorbing turbine comprising axially spaced walls contoured to form a venturi-shaped energy absorbing chamber, main vanes interposed between said walls, a ring movable circumferentially in one of said walls, a group of rectifying vanes adjacent the inlet to each main vane, each of said rectifying vanes being operably connected to one of said walls and to said ring and movable angularly relative to the inlet to the main vanes, and yielding means associated with said ring to position the rectifying vanes to deflect the fluid to flow relative to the main vanes at the optimum angle thereby minimizing fluid turbulence.

9. A rotatable energy absorbing wheel for a turbounit comprising a rotatable toroidal ring, main energy absorbing vanes positioned in said toroidal ring, and a group of rectifying vanes positioned adjacent the inlet and outlet to each of the main vanes to deviate fluid flow through said toroidal ring to produce the optimum angle of fluid flow through the main vanes and minimize fluid turbulence.

10. In a turbotransmission, an energy absorbing turbine comprising axially spaced walls contoured to form a venturi-shaped energy absorbing chamber, main vanes interposed between said walls beyond the point of maximum restriction of the venturi, a ring movable circumferentially in one of said walls, a group of rectifying vanes positioned at the point of maximum restriction of the venturi and adjacent the inlet to each main vane, each of said rectifying vanes being operably connected to one of said walls and to said ring and movable angularly relative to the inlet to the main vanes, and yielding means associated with said ring to position the rectifying vanes to deflect the fluid to flow relative to the main vanes at the optimum angle.

JOSEPH JANDASEK.